United States Patent [19]

Droulon

[11] Patent Number: 5,454,280
[45] Date of Patent: * Oct. 3, 1995

[54] JACK WITH A DEFORMABLE BAR AND ROLLERS FOR THE BLOCKAGE OF TWO MEMBERS ARTICULATED TOGETHER

[75] Inventor: Georges Droulon, Flers, France

[73] Assignee: Bertrand Faure Automobile "BFA", Massy, France

[*] Notice: The portion of the term of this patent subsequent to Apr. 12, 2011 has been disclaimed.

[21] Appl. No.: 133,961

[22] Filed: Oct. 6, 1993

[30] Foreign Application Priority Data

Oct. 9, 1992 [FR] France .................................. 92 12035

[51] Int. Cl.⁶ ...................................................... G05G 5/00
[52] U.S. Cl. ............................ 74/531; 74/577 M; 188/67; 297/375
[58] Field of Search ......................... 74/527, 575, 577 M, 74/531; 297/362.11, 362.12, 216.1, 375; 188/67

[56] References Cited

U.S. PATENT DOCUMENTS

| | | | |
|---|---|---|---|
| 4,579,386 | 4/1986 | Rupp et al. | 297/362.12 |
| 4,865,386 | 9/1989 | Detloff et al. | 297/375 |
| 5,301,569 | 4/1994 | Droulon | 74/531 |

FOREIGN PATENT DOCUMENTS

| | | |
|---|---|---|
| 297558 | 3/1972 | Austria . |
| 0234160 | 9/1987 | European Pat. Off. . |
| 0419336 | 3/1991 | European Pat. Off. . |
| 2547078 | 12/1984 | France . |
| 2574721 | 6/1986 | France . |

*Primary Examiner*—Charles A. Marmor
*Assistant Examiner*—Mary Ann Battista
*Attorney, Agent, or Firm*—Robert W. Becker & Associates

[57] ABSTRACT

At least one toothed roller cooperates with a deformable bar with respect to a casing which contains at least one V-shaped cam. The V-shaped cam has a central portion with opposed toothed ramps cooperating both with the toothed roller. A control cam acting on the V-shaped cam for permitting a blockage of the whole assembly is provided. The deformable bar is either made of vertical blades assembled and fixed to one another or provided with transverse bores. The bar will be deformed under action of the toothed roller upon great impact in an accident.

4 Claims, 4 Drawing Sheets

JACK WITH A DEFORMABLE BAR AND ROLLERS FOR THE BLOCKAGE OF TWO MEMBERS ARTICULATED TOGETHER

FIELD OF THE INVENTION

The invention relates to a jack with a deformable bar and rollers for the blockage of two members articulated together by means of the jack.

BACKGROUND OF THE INVENTION

Roller jacks for latching two elements articulated together have been known for a long time, these jacks being used particularly in automobiles for seats comprising a back portion with an adjustable inclination and an adjustable base portion (centering of the position of the sitting portion of the seat) and also for adjusting in height and inclination the head-rests as well as the thigh cushions of the respective seat.

This is, for example, the case with the device disclosed in European Document 0 419 336 which shows a mechanical jack having a rectilinear or circular displacement, in which a toothed roller cooperates with a smooth bar with respect to a casing enclosing two reversed V-shaped members, the central portions of which form a toothed ramp cooperating with a blocking cam.

From European Document 0 234 160 a rectilinear jack is known which shows a mobile rod extending through a casing or cage in which are placed, as in the above case, two V-shaped members, the inner portion of which is not toothed, but cooperates also with smooth rollers for enabling a blocking or unblocking of the jack with assistance of a cam.

French Document 2 574 721 shows the blocking of a continuous linear adjusting device comprised of two opposed rectilinear members which terminate each in two assemblies of interconnected horizontal strips which can be blocked by rollers with assistance of a double cam. The rollers are also housed inside reversed V-shaped members, and the entire assembly is finally placed inside a casing.

French Document 2 547 078 relates to a device of the same nature as the above devices, but is of a more complicated construction.

Indeed, all these mechanisms are more or less satisfactory, but they all suffer from a major disadvantage which is that, when an accident occurs to the vehicle equipped with these roller jacks, i.e. when it is absolutely necessary to obtain an instantaneous blockage and securing, it has been found that the members which are in motion, and particularly the rollers, cause the metal to flow on the sliding bar, thereby preventing an instantaneous blockage. Furthermore, the rollers have a tendency to slide before blocking.

This represents a considerable danger, and is the reason why means have been considered for preventing such a phenomenon which presents intolerable extra hazards upon a frontal or lateral impact on the vehicle.

SUMMARY OF THE INVENTION

The jack for articulating two members and for blocking the two members with a deformable bar according to the present invention is characterized by:

a casing;

at least one V-shaped cam having a central portion with opposed toothed ramps, the V-shaped cam slidably connected within the casing;

a control cam acting on said at least one V-shaped cam for controlling a blocking position of the jack;

at least one toothed roller positioned in the central portion of the V-shaped cam for cooperating with the toothed ramps;

a deformable bar made of individual vertically positioned strips attached to one another, the deformable bar extending through the casing and forming one of the members to be articulated, wherein two of the strips have a shorter vertical height than two others such that the deformable bar has longitudinal bottom grooves where the two strips of the shorter vertical height are positioned, the bottom grooves cooperating with said at least one toothed roller for blocking the deformable bar within the casing in the blocking position of the jack, the deformable bar being deformed upon impact in an accident for securing it at the casing.

Preferably, the jack further comprises a plate and the casing has an upper lid. The plate is positioned between the deformable bar and the upper lid and has first serrations at an upper side thereof facing the upper lid and second serrations at a bottom side thereof facing the deformable bar. The first serrations are provided for additionally securing the upper lid to the plate and the second serrations for securing the plate to the deformable bar.

Advantageously, the deformable bar has a central zone with transverse bores, wherein the deformable bar is deformed upon impact in an accident for additionally securing the deformable bar at the plate by at least one toothed roller riding up on the ramps and deforming the transverse bores.

In another embodiment of the present invention, the lack comprises:

a casing;

at least one V-shaped cam having a central portion with opposed toothed ramps, the V-shaped cam slidably connected within the casing;

a control cam acting on said at least one V-shaped cam for controlling a blocking position of the jack;

at least one toothed roller positioned in the central portion of the V-shaped cam for cooperating with the toothed ramps;

a deformable bar extending through the casing and forming one of the members to be articulated, the deformable bar cooperating with the at least one toothed roller for blocking the deformable bar within the casing in the blocking position of the jack, the deformable bar having a central zone with transverse bores, wherein the deformable bar is deformed upon impact in an accident for securing the deformable bar at the casing by at least one toothed roller riding up on the ramps and deforming the transverse bores.

An object of the present invention is to provide a deformable sliding bar which, in normal use and even under a small impact, does not become deformed, while, when the impact is great, the bar will be deformed under action of the rollers, thereby causing an irreversible immediate blockage absorbing the energy caused by the impact and thereby avoiding all or at least some of the body injuries inherent to such accidents for the passenger sitting on the seat.

According to the invention, the jack with a deformable bar and rollers for a blockage of two elements articulated together by means of the jack has at least one toothed roller cooperating with the bar with respect to a casing containing at least one member forming a V-shaped cam. The V-shaped cam has central portions with opposed toothed ramps cooperating both with the one toothed roller. A control cam for permitting a blockage of the whole assembly is provided. The bar is made of vertical strips put together and attached to one another, wherein two of the vertical strips are shorter than two others so as to form lower longitudinal grooves for cooperating with the at least one toothed roller.

According to another feature of the invention, the jack with a deformable bar and rollers for a blockage of two members articulated together by means of the jack has at least one toothed roller cooperating with the bar with respect to a casing containing at least one member forming a V-shaped cam, wherein the V-shaped cam has central portions with opposite toothed ramps cooperating both with the toothed roller. A control cam for permitting a blockage of the whole assembly is provided, and the bar has a central zone with transverse bores which are deformed to an oval shape under action of the at least one toothed roller riding up on the toothed ramps of the V-shaped cam when there is a great impact, thereby anchoring strongly the bar inside the casing.

Various other features of the invention will become more apparent from the following detailed description.

BRIEF DESCRIPTION OF THE DRAWINGS

Embodiments of the invention are shown, by way of non-limiting examples, in the accompanying drawings, wherein.

DESCRIPTION OF PREFERRED EMBODIMENTS

Figures 1, 2:
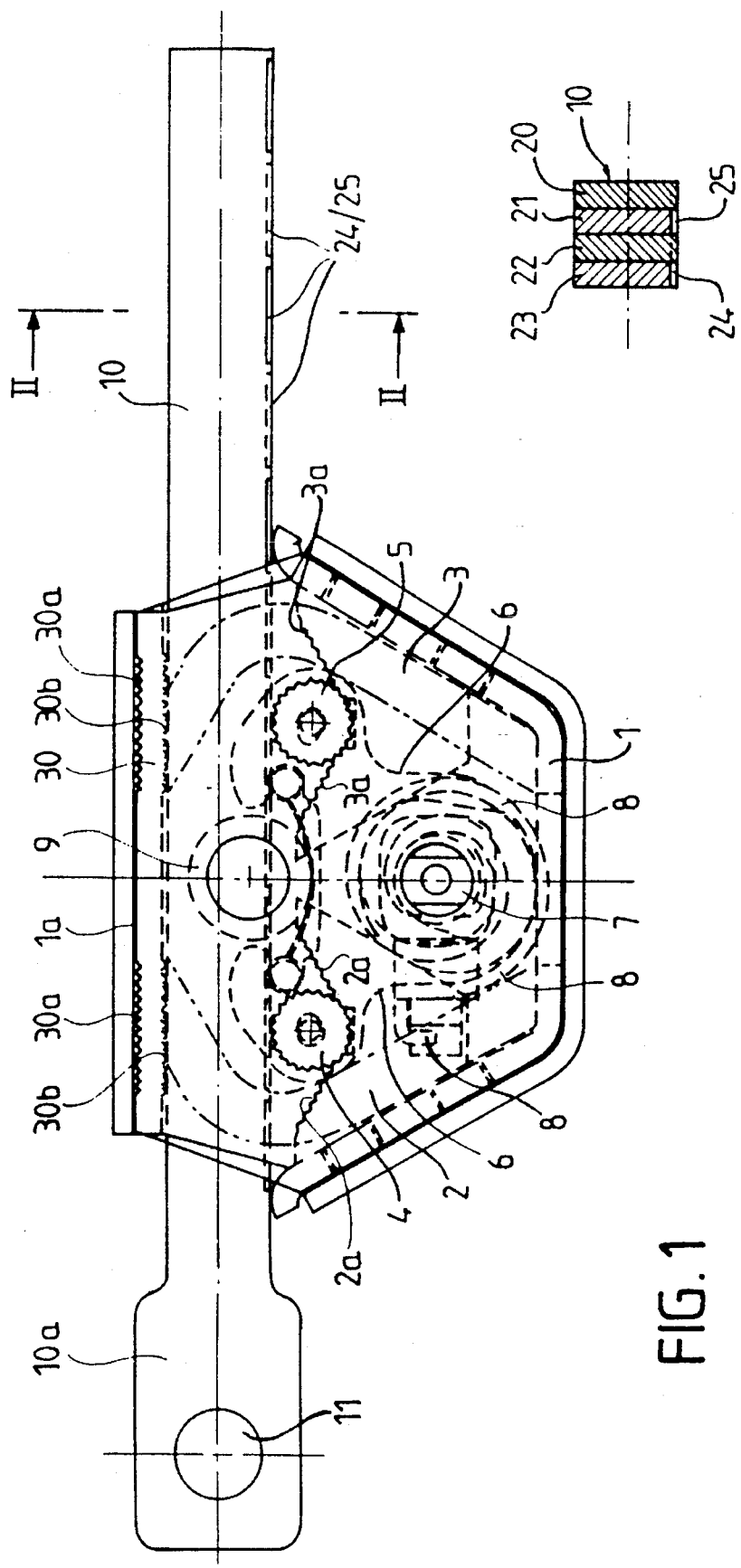
FIG. 1 is a longitudinal elevational view of a roller jack comprising a deformable bar (the jack being in the locked position for normal use)
FIG. 2 is a cross-sectional view taken along line II—II of FIG. 1.
Figure 2A:
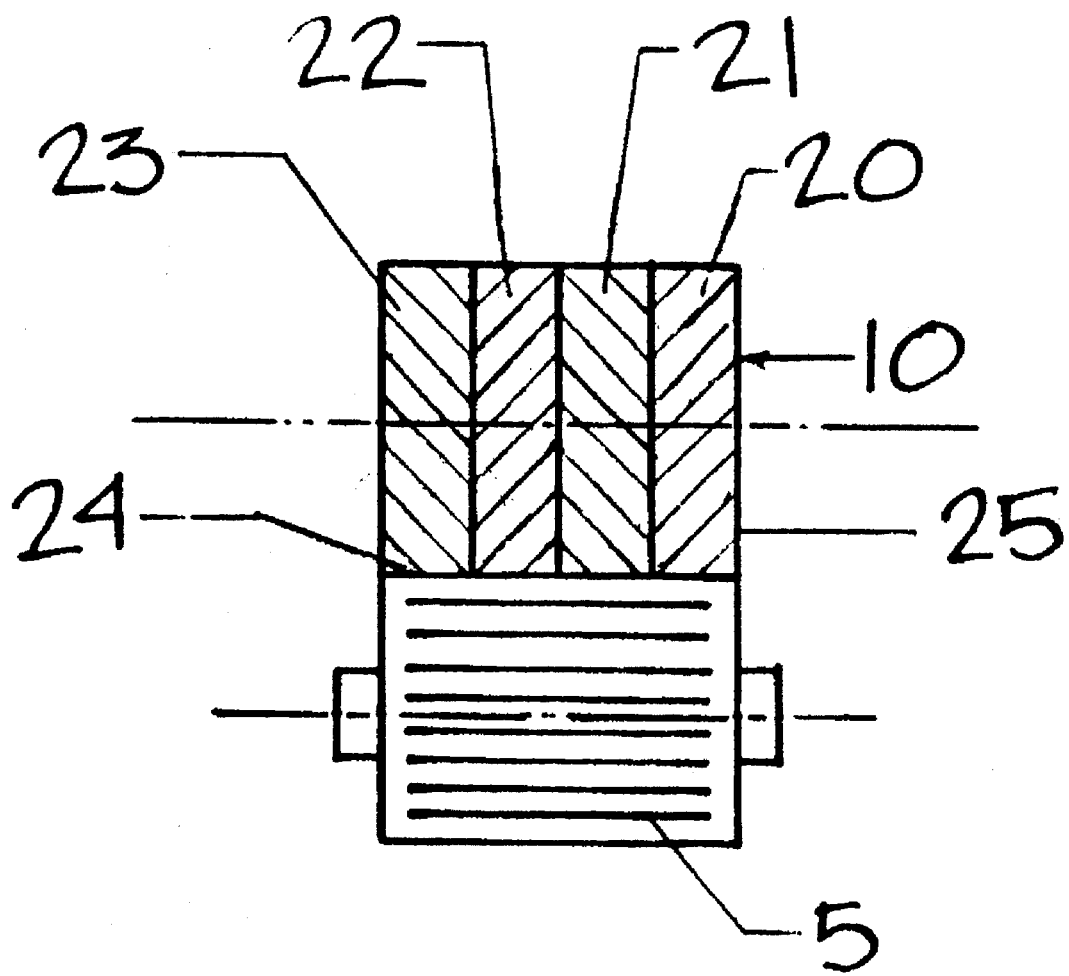
FIG. 2a shows schematically the positioning of one roller at the deformable bar.

FIG. 1 shows a casing 1 of a trapezoidal shape containing two V-shaped cams 2, 3 with inner toothing ramps 2a, 3a. They contain toothed rollers 4, 5. The toothed rollers 4, 5 are mounted on pins rigidly connected to a member 6 in the shape of a reversed two-pointed hat and are subjected to the action of a control cam 7. The control cam 7 is biased into its rest position by a stressed spring 8. The casing 1 is attached by a cylindrical part 9 to one of the members to be articulated together, while a sliding bar 10 has, at its free end 10a, a zone with a hole 11 for attachment to another one of the members to be articulated together.

As shown in FIG. 2, the bar 10 is made of vertical strips 20, 21, 22, 23 placed together and fastened to one another, the strips 21 and 23 being shorter than the strips 20, 22 so as to form lower longitudinal grooves 24, 25 into which the teeth of the toothed rollers 5 can easily penetrate.

As can be understood from FIG. 1, the bar 10 is normally clamped between the rollers 4 and 5 for a normal use of the Jack. A plate 30 is placed between the underside of an upper portion 1a, forming the lid of the casing 1, and the top of the deformable bar 10, the plate 30 being serrated both in its upper portion and in its lower portion (serration lines 30a, 30b).

The plate 30 is rigidly connected to the casing 1. When there is a strong impact and when therefore the toothed rollers 4, 5 are propelled along one of the ramps 2a, 3a of the V-shaped cams 2, 3, the plate 30 will cause, due to a penetration of the serrations of the toothed rollers 4, 5 into the longitudinal grooves 24, 25 of the sliding bar 10, a thrust on the deformable sliding bar 10 in the upward direction. The upper face of the sliding bar 10 will therefore be anchored in the serrations 30b of the plate 30, and if the force is very strong, the upper serrations 30a will penetrate the portion 1a of the casing 1 and energetically lock the rollers 4, 5, the deformable bar 10 and the plate 30 in the lid 1a. This movement causes a very firm and resistant blockage of the jack and therefore of the articulation using this jack, which, due to the deformations mentioned above, absorbs a large quantity of energy while avoiding all or at least part of bodily injuries of a passenger sitting on a seat with the respective jack.

Figure 3:
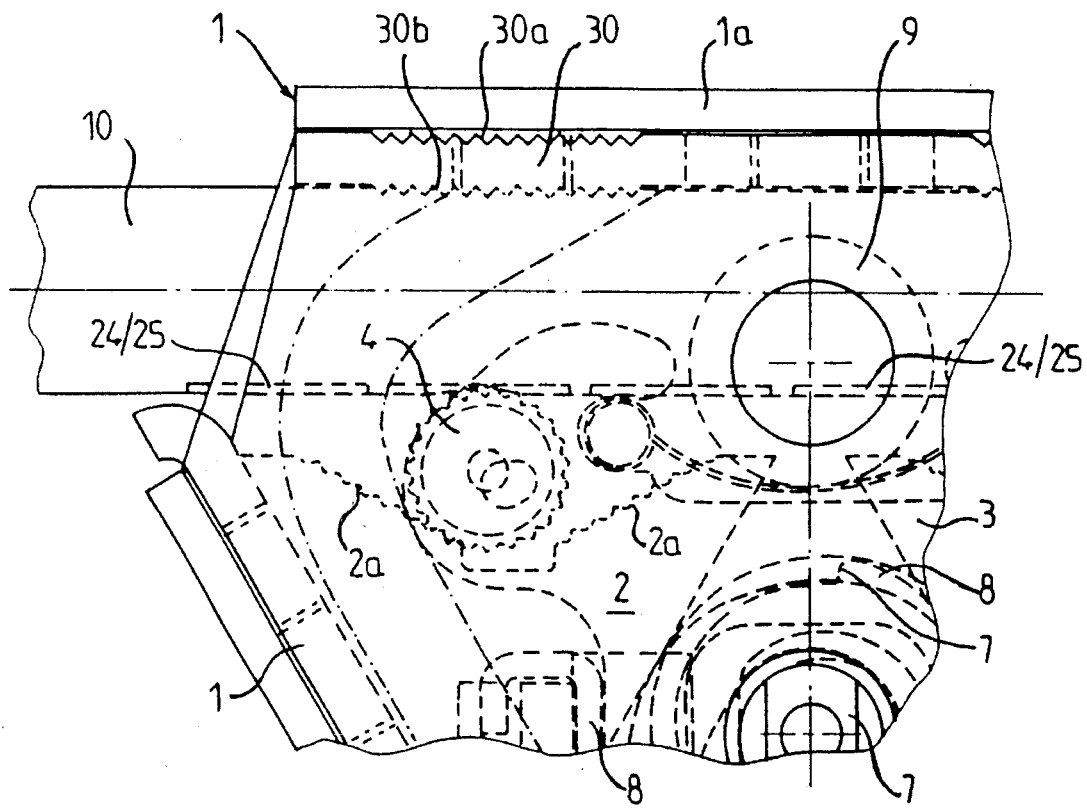
FIG. 3 shows the jack of FIG. 1 in locked position under a great impact force.

FIG. 3 shows the position occupied by the roller 4 when there is an abrupt blockage (strong impact) of the deformable sliding bar 10 with a penetration of the toothed rollers 4, 5 in the grooves 24, 25 and of the deformable bar 10 in the serrations 30b (blockage with permanent deformation).

When the impact is of a small intensity, the toothed rollers 4 and 5 penetrate only slightly into the longitudinal grooves 24, 25 of the sliding bar 10 without causing a deformation of these grooves of the projecting portion of the deformable sliding bar 10. Therefore when the impact is absorbed, it is then possible, with assistance of the control cam 7, to disengage the toothed rollers 4 and 5 and to return to the starting position.

Figure 4:
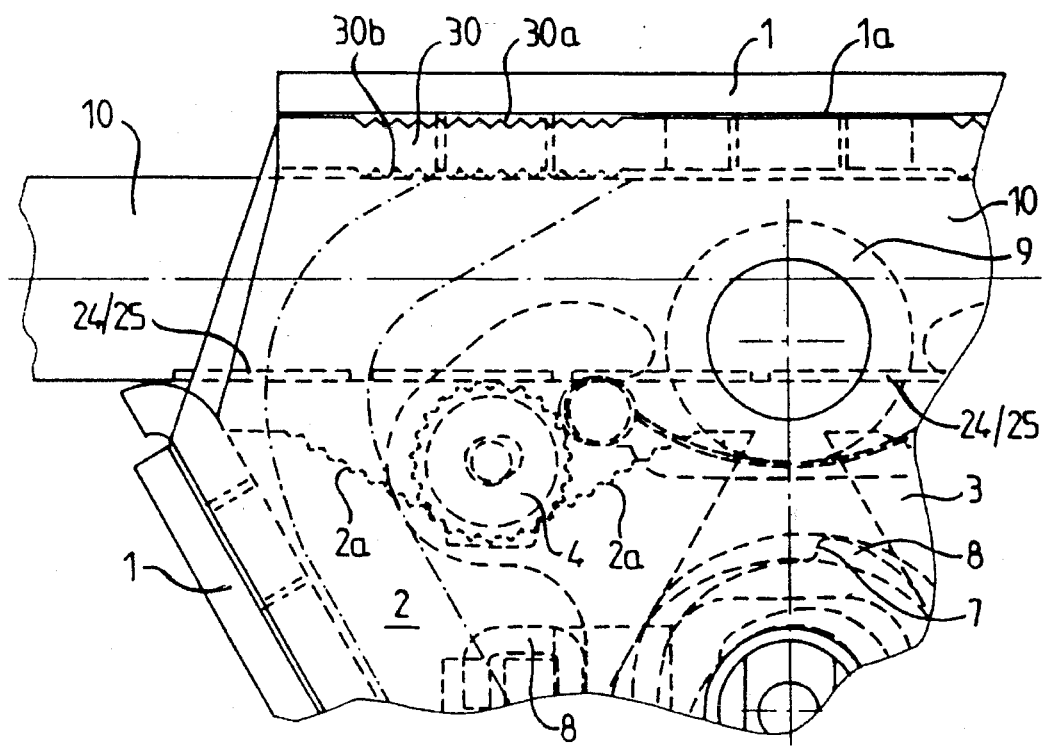
FIG. 4 is a view similar to FIG. 1 (the jack being in the locked position for normal use)

In FIG. 4, the deformable bar 10 is shown in its normal blocked position clamped between the rollers 4 and 5 for a normal use of the jack.

Figure 5:
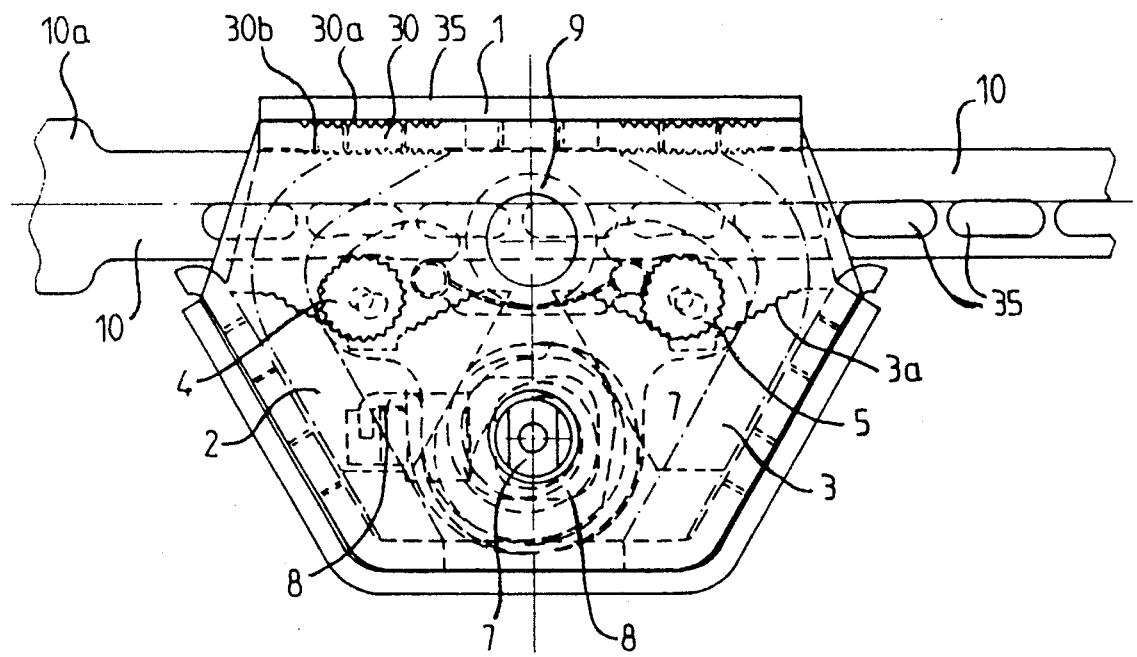
FIG. 5 shows another embodiment of a deformable sliding bar in the locked position under a high impact force at the moment of an impact.
Figure 6:
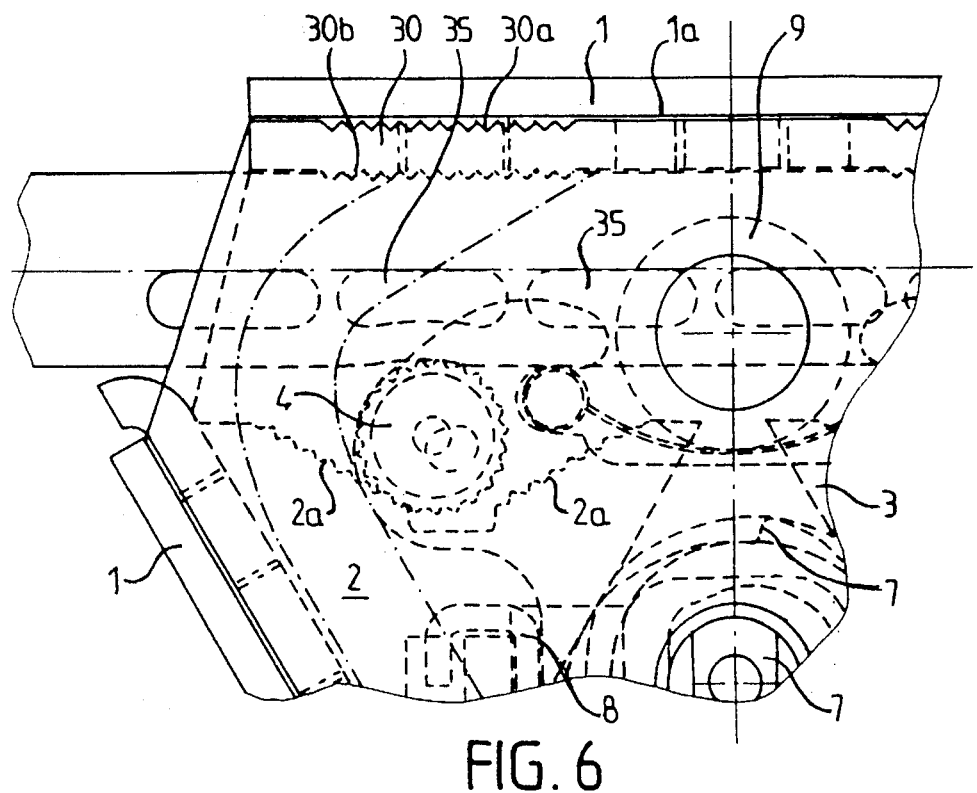
FIG. 6 is an enlarged view of FIG. 5.

In the variant of FIGS. 5 and 6, the bar 10 comprises (instead of the grooves 24, 25 of FIGS. 1–4) a plurality of transverse bores 35. Obviously, the deformable bar can be provided with both grooves and transverse bores. The other members of the device shown in FIGS. 5 and 6, being identical to those of FIGS. 1–4, are designated by the same reference numerals.

FIGS. 5 and 6 show the position of the rollers 4, 5 when there is an instantaneous blockage under the effect of a strong impact. One can see that at that moment the toothed rollers 4, 5 ride up on the ramps 2a, 3a of the V-shaped cams 2, 3, thereby causing a permanent deformation of the deformable bar 10. Actually, the deformable bar 10, under the effect of the toothed rollers 4, 5, is deformed (see FIG. 6) by ovalizing at least one transverse bore 35 (see FIGS. 5 and 6). This causes at the same time a penetration of the deformable bar 10 into the serrations 30b of the strip 30, and even sometimes a penetration of the serrations 30a into the lower portion of the lid of the casing 1.

There is thus obtained an energetic and total blockage of the deformable bar 10, absorbing a large quantity of energy as hereabove explained.

It is obvious that in the case of FIGS. 3, 5, and 6, the deformable bar 10 will have to be exchanged since, normally, the bar will be unusable after these permanent deformations.

The present invention is, of course, in no way restricted to the specific disclosure of the specification and drawings, but also encompasses any modifications within the scope of the appended claims.

What I claim is:

1. A jack for articulating two members and for blocking the two members, said jack comprising:

a casing;

at least one V-shaped cam having a central portion with opposed toothed ramps, said at least one V-shaped cam slidably connected within said casing;

a control cam acting on said at least one V-shaped cam for controlling a blocking position of said jack for blocking said two members;

at least one toothed roller positioned in said central portion of said at least one V-shaped cam for cooperating with said toothed ramps;

one of said two members being a deformable bar made of individual vertically positioned strips attached to one another, said deformable bar extending through said casing, wherein two of said strips have a shorter vertical height than two others of said strips such that said deformable bar has longitudinal bottom grooves where said two strips of said shorter vertical height are positioned, said bottom grooves cooperating with said at least one toothed roller for blocking said deformable bar within said casing in said blocking position of said jack, said deformable bar being deformed upon impact in an accident for securing said deformable bar at said casing.

2. A jack according to claim 1, further comprising a plate and wherein said casing has an upper lid, with said plate positioned between said deformable bar and said upper lid and having first serrations at an upper side thereof facing said upper lid and second serrations at a bottom side thereof facing said deformable bar, said first serrations securing said plate at said upper lid and said second serrations securing said plate at said deformable bar.

3. A jack according to claim 2, wherein said deformable bar has a central zone with transverse bores, wherein said deformable bar is deformed upon impact in an accident for additionally securing said deformable bar at said plate by said at least one toothed roller riding up on said toothed ramps and deforming said transverse bores.

4. A jack for articulating two members and for blocking the two members, said jack comprising:

a casing;

at least one V-shaped cam having a central portion with opposed toothed ramps, said at least one V-shaped cam slidably connected within said casing;

a control cam acting on said at least one V-shaped cam for controlling a blocking position of said jack for blocking the two members;

at least one toothed roller positioned in said central portion of said at least one V-shaped cam for cooperating with said toothed ramps;

one of said two members being a deformable bar extending through said casing said deformable bar cooperating with said at least one toothed roller for blocking said deformable bar within said casing in said blocking position of said jack, said deformable bar having a central zone with transverse bores, wherein said deformable bar is deformed upon impact in an accident for securing said deformable bar at said casing by said at least one toothed roller that upon impact in an accident rides up on said toothed ramps and deforms said transverse bores.

* * * * *